(12) United States Patent
Gaddis

(10) Patent No.: US 10,529,251 B2
(45) Date of Patent: Jan. 7, 2020

(54) LEARNING TOOL AND GAME FOR IDENTIFYING FRACTIONAL INDICIA ON TAPE MEASURES AND THE LIKE, AND FOR DEVELOPING TACTILE SENSE, EYE-HAND COORDINATION, DEXTERITY, AND SPEED

(71) Applicant: John L. Gaddis, Royalton, IL (US)

(72) Inventor: John L. Gaddis, Royalton, IL (US)

( * ) Notice: Subject to any disclaimer, the term of this patent is extended or adjusted under 35 U.S.C. 154(b) by 184 days.

(21) Appl. No.: 15/800,862

(22) Filed: Nov. 1, 2017

(65) Prior Publication Data
US 2018/0122267 A1 May 3, 2018

Related U.S. Application Data

(60) Provisional application No. 62/415,866, filed on Nov. 1, 2016.

(51) Int. Cl.
| | |
|---|---|
| *G09B 19/02* | (2006.01) |
| *G09B 19/22* | (2006.01) |
| *G01B 3/10* | (2006.01) |
| *G09B 19/24* | (2006.01) |
| *A63F 3/04* | (2006.01) |
| *A63F 3/00* | (2006.01) |

(52) U.S. Cl.
CPC ............ *G09B 19/22* (2013.01); *A63F 3/0457* (2013.01); *G01B 3/1082* (2013.01); *G09B 19/24* (2013.01); *A63F 2003/00593* (2013.01); *A63F 2003/046* (2013.01); *A63F 2250/1063* (2013.01)

(58) Field of Classification Search
CPC ....................................................... G09B 19/02
USPC ................. 434/188, 191, 195, 196, 200, 205
See application file for complete search history.

(56) References Cited

U.S. PATENT DOCUMENTS

| | | | | | |
|---|---|---|---|---|---|
| 2,695,462 | A | * | 11/1954 | Gilbert | A63F 9/18 434/200 |
| 2,926,432 | A | * | 3/1960 | Helberg | G09B 19/02 434/196 |
| 3,837,096 | A | * | 9/1974 | Sterling | G09B 19/02 434/200 |
| 4,144,657 | A | * | 3/1979 | Dumovich | G09B 23/02 434/187 |
| 4,614,042 | A | * | 9/1986 | Maurer | G09B 21/003 33/494 |
| 4,778,390 | A | * | 10/1988 | Marans | G09B 19/02 434/187 |
| 4,979,749 | A | * | 12/1990 | Onanian | A63F 3/00574 235/90 |
| 5,597,308 | A | * | 1/1997 | Woldenberg | G09B 1/06 434/195 |

(Continued)

*Primary Examiner* — Kurt Fernstrom
(74) *Attorney, Agent, or Firm* — Matthews Edwards LLC

(57) ABSTRACT

A learning tool for identifying and memorizing fractional indicia on measuring devices including tape measures, rulers, other lined media, and the like, including incorporated into a fun to play game that emphasizes the above skills development while additionally utilizing and improving tactile feel, dexterity, eye-hand coordination and speed to accomplish work tasks by requiring picking up and properly manipulating small objects analogous to handling and placement of nails for hammering and screws for inserting them into specified holes. The tool can additionally incorporate measureable metrics for determining progress and identifying areas requiring additional practice.

27 Claims, 5 Drawing Sheets

(56) References Cited

U.S. PATENT DOCUMENTS

| | | | | |
|---|---|---|---|---|
| 5,679,002 A * | 10/1997 | Scelzo | ................ | A63F 3/0415 |
| | | | | 273/241 |
| 5,782,628 A * | 7/1998 | Alioto | .................... | G09B 19/02 |
| | | | | 434/200 |
| 5,979,752 A * | 11/1999 | Holloway | ............. | G01G 23/40 |
| | | | | 116/325 |
| 6,129,551 A * | 10/2000 | Martin | .................. | G09B 19/02 |
| | | | | 434/188 |
| 6,813,841 B1 * | 11/2004 | Ramsey | ................ | G01B 3/004 |
| | | | | 33/491 |
| 7,534,106 B1 * | 5/2009 | Dutcher | ................ | G09B 19/02 |
| | | | | 434/188 |
| 7,549,865 B2 * | 6/2009 | Avery | ................... | G09B 19/02 |
| | | | | 434/191 |
| 7,862,337 B2 * | 1/2011 | Panicali | ............... | A63F 3/0457 |
| | | | | 434/128 |
| 7,909,608 B2 * | 3/2011 | Zhou | ..................... | G09B 19/02 |
| | | | | 434/188 |
| 8,070,493 B2 * | 12/2011 | Wilson | .................. | G09B 19/02 |
| | | | | 434/187 |
| 8,438,744 B1 * | 5/2013 | Mann | ..................... | G01B 3/002 |
| | | | | 33/491 |
| 2011/0059424 A1 * | 3/2011 | Wijesiriwardena | .... | G09B 23/02 |
| | | | | 434/200 |

\* cited by examiner

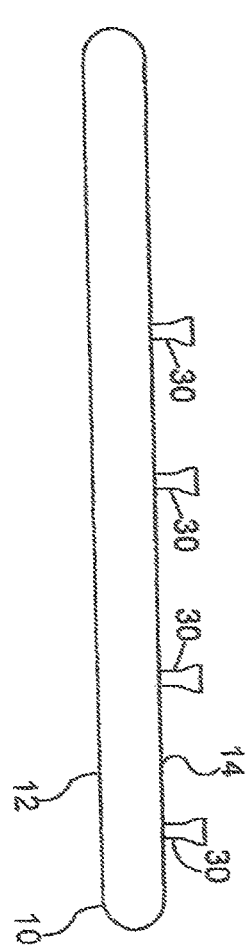
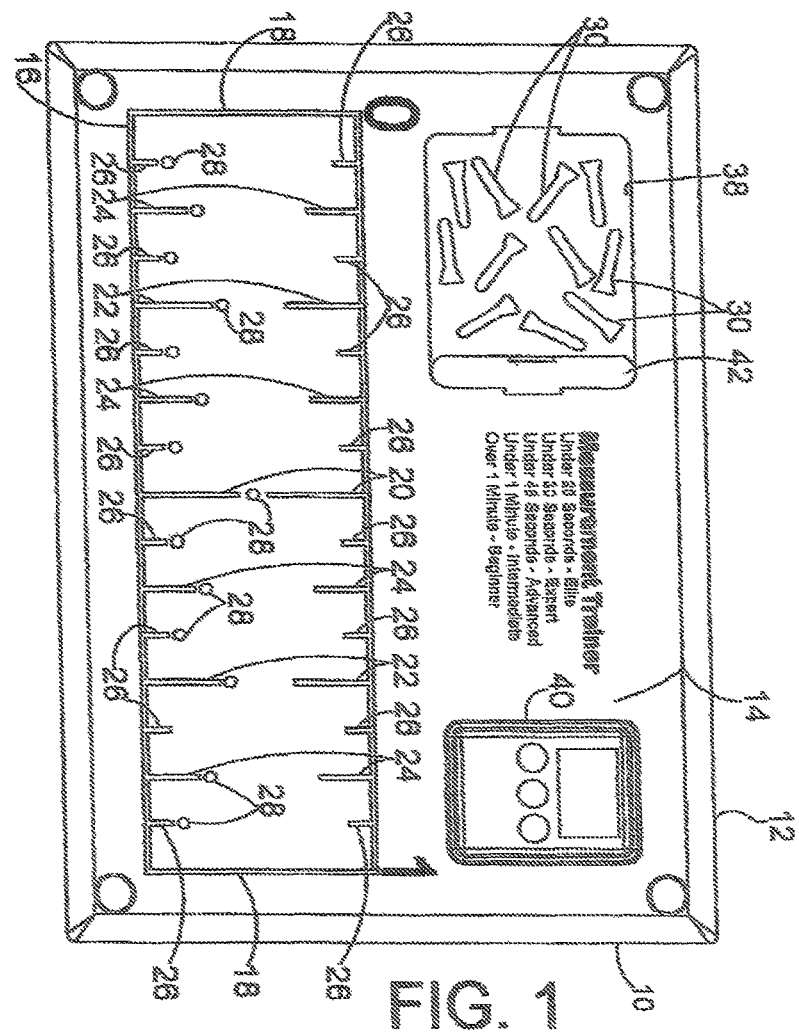
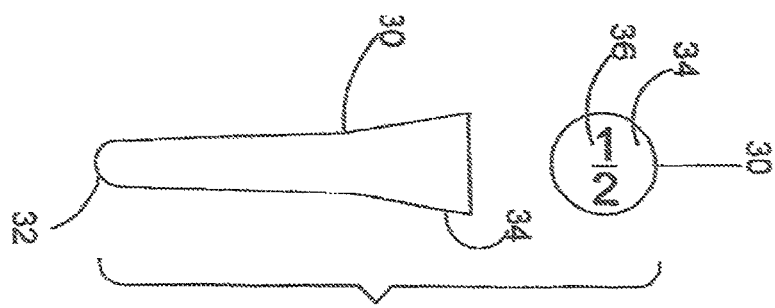

LEARNING TOOL AND GAME FOR IDENTIFYING FRACTIONAL INDICIA ON TAPE MEASURES AND THE LIKE, AND FOR DEVELOPING TACTILE SENSE, EYE-HAND COORDINATION, DEXTERITY, AND SPEED

This application claims the benefit of U.S. Provisional Application No. 62/415,866, filed Nov. 1, 2016.

TECHNICAL FIELD

This invention relates to a learning tool for identifying and memorizing fractional indicia on measuring devices including tape measures, rulers, other lined media, and the like, and more particularly, that can be in a preferred embodiment is incorporated into a fun to play game that emphasizes the above skills development while additionally utilizing and improving tactile feel, dexterity, eye-hand coordination and speed to accomplish work tasks by requiring picking up and properly manipulating small objects analogous to handling and placement of nails for hammering and screws for inserting them into specified holes, and which incorporates measureable metrics for determining progress and identifying areas requiring additional practice.

BACKGROUND ART

U.S. Provisional Application No. 62/415,866, filed Nov. 1, 2016, is incorporated herein by reference in its entirety.

Students and apprentice tradespersons such as carpenters, mill rights, plumbers, pipefitters, sheet metal fabricators, and the like, frequently encounter considerable difficulty in grasping the concepts of measurement, and even more experienced users have problems correctly identifying indicia commonly used to identify units of measurement, particularly graduations representing fractional units on measuring devices such as tape measures, rulers, and the like. For example, a tradesperson such as a carpenter needs a fundamental level of understanding of the basic units of measure before being able to competently apply the knowledge when using measuring devices such as tape measures and rulers, for instance, and they are commonly required to correctly identify fractional graduations on the measuring devices for measuring and marking lumber for cutting to designated lengths, placement of nails and other fasteners, fitting items together, determining the size of openings, etc.

For students and apprentices, units of measure having fractional components of larger measurement units are conceptually difficult to comprehend since measuring is generally a new experience involving unusual terms and apparently unrelated measurement units. Compounding this challenge is the fact that many measuring apparatus such as tape measures, rulers, and the like commonly used by trades, represent fractions with nondescript indicia such as lines and/or hash marks, with perhaps only small differences in length of the indicia as the distinguishing aspect of the indicia. In particular in this regard, commonly used, commercially available measuring devices such as tape measures and rulers, typically employ graduated scales to denote the fractional increments, with cross lines or hash marks of different lengths to denote the fractions, for example, whole numbers being identified with a numerical value and the longest line; ½ being identified by a second longest line; ¼th and ¾ths being 3rd longest; ⅛, ⅜, ⅝, and ⅞ being 4th longest; and ¹⁄₁₆, ³⁄₁₆, ⁵⁄₁₆, and ⁷⁄₁₆ being 5th longest; and so on for smaller fractions such as 32nds and 64ths, if used. Typically in the U.S. imperial measuring system, the fractional units will be of the inch, and thus the graduations will be small and close together. As such, a simple instructional measuring apparatus which assists students and learning tradespersons in identifying commonly employed indicia of basic fractional units of measure, would be highly desirable.

Another impediment to learning fractional indicia for new tradespersons is that they often have not enjoyed success, and may have failed and/or left traditional schools, and so be prejudiced or have a negative mindset toward that environment and its normal educational methods and tools; and/or fear or disdain learning opportunities and exercises. They may also have prejudices against teachers. However, it has been observed that many of these persons greatly enjoy and have a more positive attitude towards games, particularly timed games and those that have a physical element wherein use of the hands is important and they can exhibit their skills. For persons who lack dexterity, any hand exercises that improve that skill are desirable, particularly if they involve learning additional vocation related skills. And even for experienced tradespersons, who must often work with their hands while standing on ladders, roofs, and other elevated structures, improving dexterity and speed, particularly picking up and manipulation small objects, is advantageous for many reasons, including for improving safety and productivity.

Thus, what is sought is a manner of conveying an enjoyable yet effective and positive learning experience to the process of learning to identify and memorize fractional indicia and increments required for acquiring measuring skills, while exercising and improving tactile feel and dexterity, and which overcomes one or more of the problems and limitations set forth above.

SUMMARY OF THE INVENTION

What is disclosed is a learning tool for fractional indicia of a measuring device and improving manual dexterity, configurable in a preferred embodiment as a game, to convey an enjoyable yet effective and positive learning experience to the process of learning to identify and memorize fractional indicia and increments required for acquiring measuring skills, while exercising and improving tactile feel and dexterity, eye-hand coordination, and which overcomes one or more of the problems and limitations set forth above.

According to a preferred embodiment, the learning tool for fractional indicia comprises a board having a surface including a linear pattern of graduated indicia representative of fractions of a whole number, comprising a predetermined plurality of transverse fractional value lines of predetermined different lengths at predetermined intervals or distances, so as to have the appearance of a segment of a standard measuring device, such as a tape measure, ruler, yardstick, etc., between two whole numbers thereof, but much, e.g., several time larger. The linear pattern can optionally include the associate whole number or numbers, for instance, a zero "0" and/or a "1", so as to represent the fractional indicia typically located between 0 and 1 on a measuring device being represented. The tool has a plurality of receptacles in or on the surface of the board in predetermined relation to the fractional value lines, respectively, such that each of the receptacles is visually associated with only one of the fractional value lines, respectively, the receptacles each having the same predetermined size and shape opening for receiving a marker. The tool includes a quantity of markers, each having a first end having a size so as to be cooperatively insertable in any one of the receptacles such that a second end of the marker will visibly extend outwardly therefrom, e.g., upwardly when the surface is generally horizontal. The second end of each of the markers has a fractional value marking associated with only one of the fractional value lines, so that only one of the markers will represent each of the fractional value lines. The tool also preferably has a container for receiving and holding the markers in random positions and orientations. This thus requires a user to remove one or a few of the markers from the container and manipulating it or them to identify the fractional value marking thereon, then grasping the markers individually between his or her fingers to insert the marker into the receptacle representative of the marker's value. In this latter regard, an objective or intent is to familiarize the student with handling and manipulating small articles like nails and screws, and properly positioning them on a surface, such as a board to be fastened, or the like. The tool of the invention is additionally optionally configured for use with just one hand, to mimic working on a ladder and other applications were the other hand is occupied, such as when holding a board or the like to be nailed or screwed, and the markers are sized and shaped to mimic nails or screws commonly handled by tradespersons such as carpenters, sheet metal workers, and the like.

As a non-limiting example the fractional value lines can represent imperial fractions, such as ½; ¼ths; ⅛ths; ¹⁄₁₆ths, ¹⁄₃₂ths, or smaller fractions. As an option or variant, value lines or other indicia and associated markers representative of commonly used percentages can be provided. Thus for example, optional markers would include percentage indicia: 25%, 33% or 33.33%; 50%; 66% or 66.66%, etc., respectively, so that a user can visually associate percentages and fractions, thus: 25% to ¼; 33% to ⅓; 50% to ½; 75% to ¾; and see that ⅓ is between ¼ and ½; ⅔ is between ½ and ¾, etc. Additional or alternative value lines can be included to denote the desired fractions and/or percents, e.g., ⅓ or 33.33%; ⅔ or 66.66%; etc. to enable visually associating their location on the board with their relationship to the whole number and the other percentages and/or fractions, with the objective of the user realizing the value of 33.33 percent and that it is ⅓ and greater than 25% and ¼ but less than 50% and ½; the value of 66.66% and that it is ⅔ and greater than 50% but less than 75%; and the value of 75% or ¾ and that it is greater than 66.66% or ⅔, and so on. As another optional aspect of the invention, the board can alternatively be incremented in decimal fractions, e.g., $\frac{1}{10}^{th}$, $\frac{1}{100}^{th}$, $\frac{1}{1000}$th, etc., as desired or required for a particular application.

As still another optional aspect of the invention, it is contemplated that the numerical values as well as the pattern of fractional incremental indicia can be removable and replaceable in its entirety, or in part, such as by using a magnetic or mechanically fastened overlay; adhesive, magnetic, or static cling film overlay; multiple clear or see through overlaying overlays, for instance, a ¼th overlay; a ⅛th overlay; a ¹⁄₁₆th overlay, etc.; or a flip chart type overlay, as desired or required for a particular application. Of course, the indicia, e.g., fractional value lines, can also be permanently affixed, e.g., by printing or painting, silk screen, engraving, molding, etc.

As further preferred aspects, the fractional value lines will have an overall, but substantially enlarged visual appearance of a segment of a ruler between two whole numbers, such as, but not limited to, zero and one inch, the overall size being enlarged, as a non-limiting example, to 6 inches (so that the spaces between adjacent fractional value lines are about 6 times larger than on the actual measuring device, ruler, tape measure, etc.); 10 inches; 24 inches, or any larger desired size, for ease of use. In particular, as a result of this enlargement, the differences between the individual fractional value lines are more visible and discernible, so that individuals that have trouble distinguishing the lines can more clearly see their differences and learn to distinguish the different lines.

So, as a non-limiting example, for a typical measuring device that is a tape measure or ruler having fractional graduations of ¹⁄₁₆th inch, there will be 16 increments or spaces between whole numbers, and thus a linear pattern of 15 fractional value lines separating the 16 increments. In the typical pattern, the whole number indicator (typically a line) will be longest; the fractional value line for ½ will be the second longest; fractional value lines for ¼th and ¾ths fractions will be the third longest; and the lines for ⅛ths and lines 26 for ¹⁄₁₆ths will be shorter still. So there will be an apparent pattern that can be learned, and it is an object of the invention to instill a positive learning experience having an element of discovery, and an element of success for the learner, so that he or she will be encouraged by the experience using the tool of the invention.

The enlargement of the pattern of indicia has been found to be helpful in the above regard, as the differences in the lengths of the lines are more apparent, and the distances between the lines allow more easily distinguishing them. It also allows a user to easily count both from a whole number, and a recognized fraction such as ½ or ¼th. So for example, if it is learned that ½ is equal to two ¼ths, that is easily proved to the user student by physically or visually counting lines, and is verified visually, e.g., the student can observe that ½ encompasses two ¼ths. Then, it can be explained that ¾th is equal to three ¼ths and it too is readily verifiable visibly and by counting. From there, it can be discerned that ¾th is ½ plus ¼th, again verifiable visibly and by counting the fractional value lines. Then it can be further learned that ¼th is equal to two ⅛ths and that ⅜ths is 3⅛ths or ¼th plus ⅛th. It can also be visually memorized that for instance, ¹¹⁄₁₆ths is one line less than ¾ths, and that ¾ths is ¹⁄₁₆ths; and ¹³⁄₁₆ths is one line or one ¹⁄₁₆th increment greater than ¾ths, etc. As another aspect of the learning experience, it can be learned that fractions can be subtracted. So for example, ½ is four ⅛ths, and that ⅜ths is ½ minus ⅛th, which is also easily visually discerned and provable by physical or visual counting. Thusly, 1¹⁄₁₆ths is ¹⁄₁₆th line less than the ¾ths line, etc.

To further aid in the learning experience, the enlarged pattern of indicia will preferably mimic or closely resemble a portion between whole numbers of a desired measuring device, such as a tape measure, so that once the system and pattern of fractional indicia are learned using the tool of the invention, transition to an actual measuring device, although much smaller, will be easier. In this regard, if overlays including the indicia are employed, they can mimic the appearance of common measuring devices, such as a well known yellow tape measure, a folding ruler, etc.

According to another preferred aspect of the invention, the tool comprises a timer for determining a time to pick up all or a selected portion of the markers; manually manipulate the markers to read the fractional value markings thereof, and insert the markers into the associated receptacles, respectively. So for example, for a tool having indicia including 15 total fractional value lines, an allotted time can be determined for correctly inserting all markers, or some portion of them. The time values can be then used as a metric or measure of success, and for identifying aspects of measurement requiring further practice or explanation. For instance, a student may be timed for inserting the ¼th inch family markers and perform well both time wise and accuracy wise, but may have poorer metrics for another fraction family, for instance, $1/16$th values. Or a student may have difficulty with fractions over ½ or below ½, or has success correctly identifying and inserting the markers, but has difficulty doing so in a timely manner. Thus it is evident that the present invention has utility for measuring a variety of aspects of performance and for identifying problem areas.

As another preferred aspect of the invention, the container for the markers can comprise a cavity within the surface of the board. As a preferred option, the container is of sufficient depth to hold all of the markers, but only when laid on their sides so that they must be picked up and manipulated (e.g., hand rotated) to read the value on the end. The container opening is additionally preferably sized and shaped so that only one or a small number of the markers can be grasped and removed at one time. The board can additionally have a cover slidable over the container, or the container is otherwise covered, to prevent loss of the markers, and to allow randomly dispersing the markers within the container after use, e.g., by shaking. The cover and container can optionally be flush with the board to facilitate stacking of multiple boards, such as for ease of classroom storage and/or handling and transportation.

As another preferred aspect of the invention, the transverse fractional value lines represent fractions of an inch and are spaced apart by distances substantially greater than the represented fractions of an inch. As non-limiting examples, an increment between two adjacent lines representative of $1/16$th inch can physically be ¼th, ½ inch, or ⅝ths inch apart, which is 4 to 10 times the actual spacing of $1/16$th inch increments on a ruler or tape measure. As a result, the enlarged size between the fractional value lines enables better envisioning the differences, and a student can more easily manually count the value lines to determine the fractional value for a particular line, with the objective being eventual ability to quickly and accurately visually distinguishing the lines without consciously counting. Then, when the student sees an actual measuring device, such as a tape measure, the overall appearance will be very similar, the only significant difference being overall size, and he or she will be able to use the device more easily and quickly, which is a principle learning objective.

According to still another preferred aspect of the invention, the learning tool is incorporated into a game utilizing a game board including a generally flat surface including a linear pattern of graduated indicia (value lines) representative of fractions of a whole number. The game board has, or has a large section, having an overall appearance suggestive of a portion of a hand held tape measure or other measuring device, such as a ruler, yardstick, etc., between two whole number indicators thereof enlarged at least several times compared to the fractional values represented, including a predetermined number of transverse fractional value lines at predetermined spaced intervals representative of fractions of a whole number. Thus, it can be envisioned that the game board will be relatively large, as a non-limiting example, such as about the size of a text book, with easily visually distinguishable fractional indicator lines, but will represent only a 1 inch segment of a tape measure or so for simplicity, so as to accentuate and make much more perceptible the differences between the different fractional value lines. As a non-limiting example, the spacing between immediately adjacent fractional value lines will be relatively large, on the order of ¼ to ½ inch or so, or greater, to facilitate manual counting initially, then visual discernment once the pattern is familiarized and increasingly memorized, which is another objective. As a result, for a linear pattern representing $1/16$th inch increments actually ¼th inch apart, the overall length of the pattern 16 would be about 4 inches. For one having ½ inch spacing, the overall length of the pattern would be about 8 inches. The pattern can have any desired overall width, as a non-limiting example, one fourth its length, or a 1 inch width for a 4 inch length pattern, and a 2 inch length for an 8 inch pattern, it being desired that the individual fractional value lines have different lengths in accordance with a standard measuring device, e.g., ½ fractional value line longest; ¼th and ¾th lines second longest; ⅛th lines third longest, and $1/16$th lines shortest.

The game board preferably includes the small receptacles in the surface associated respectively with the value lines, e.g., at the ends thereof, so as to be visually associated therewith, respectively. The game will include a quantity of game piece markers contained in random positions and orientations, each of the markers including a first end having a size so as to be cooperatively insertable in any one of the receptacles such that a second end of the marker will visibly extend outwardly therefrom, each of the second ends of the markers having a fractional value marking associated with only one of the fractional value lines. The game also preferably includes the timer.

To play the game, the markers are to be removed from the container and individually inserted into the associated receptacles. As a non-limiting example, the second ends of the markers can have a sectional extent or width of ¼ inch or so, so as to mimic the head of a screw or nail. Thus picking up the markers mimics picking up screws or nails as would occur on a job. This also makes the marking easily readable from the end, and most fasteners, e.g., nails, screws, are viewed from the end when aligning with a surface into which they will be hammered or screwed, and thus manipulating to align for reading the end of the marker mimics alignment for fastener use. As a benefit of timed playing of the game, players can compete against their own previous scores and other players, to create competitive enthusiasm and the resultant desire to increase the speed at which the game is completed. This is advantageous, as it also increases and improves manual dexterity speed and coordination which will be advantageous for the player's trade. As another benefit of the improved dexterity, the user is less likely to mishandle or drop fasteners on the job.

By playing the game multiple times and increasing the speed of completion, the player's esteem and sense of accomplishment is improved. All the while, the player is increasingly committing the required fractions and their positions on the board and thus the equivalents on a measuring device, to memory, and recalling the memorized values. The better the memorization, the faster the player completes the game. Thus measurable metrics are achieved to enable evaluating the player's progress, both in terms of speed of ability and accuracy. And the incorrectly placed markers provide ready indicators of the nature of errors, that is, what fractions and/or where on the board the player is having trouble with, so the shortcomings can be overcome.

It has been found that the fraction memorization achieve by use of the invention, whether as a game or strictly as a learning tool, or both, translates directly to faster and more accurate measuring device use, which is an ultimate object of the invention, and which can be achieved in a fun and competitive manner, which will appeal to more competitive users. As another advantage, the game can be played with the board horizontal, and in various upright orientations, e.g., with the fraction pattern oriented upwardly, downwardly, sidewardly, and at angles to horizontal, which has been found to further facilitate more accurate use of measuring devices in those various orientations.

BRIEF DESCRIPTION OF THE DRAWINGS

FIG. 1 is a front view of a learning tool of the invention;
FIG. 2 is a side view of the learning tool;
FIG. 3 is a side view and an end view of a representative marker of the learning tool.

DESCRIPTION OF PREFERRED EMBODIMENTS OF THE INVENTION

Figure 4:
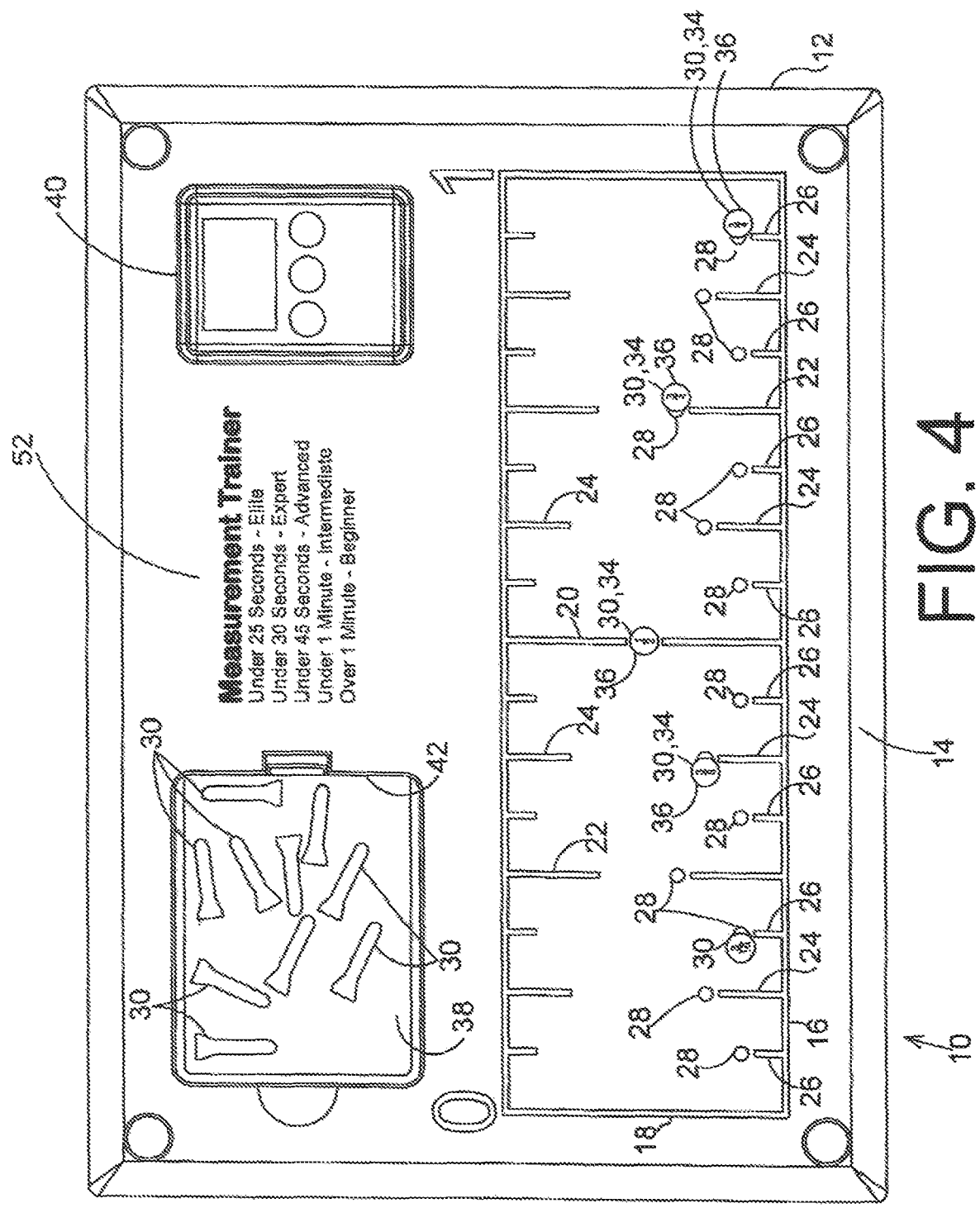
FIG. 4 is a front view of another learning tool of the invention, incorporated into a complete game.

Referring variously to FIGS. 1-7, preferred learning tools 10 for fractional indicia according to the invention comprise a board 12 having a surface 14 including a linear pattern 16 of graduated indicia representative of fractions of a whole number, comprising at least one transverse whole number indicator 18 (here comprising two, "0" and "1") and a predetermined plurality of transverse fractional value lines 20, 22, 24, 26 of different lengths at predetermined intervals or distances from the whole number indicators. Tool 10 has a plurality of receptacles 28 in or on the surface 14 of the board 12 in predetermined relation to the fractional value lines 20-26, respectively, such that each of the receptacles 28 is visually associated with only one of the fractional value lines 20-26, respectively, and each of the receptacles 28 has a predetermined size and shape opening. The tool 10 includes a quantity of markers 30, each of the markers 30 including a first end 32 having a size so as to be cooperatively insertable in any one of the receptacles 28 such that a second end 34 of the marker 30 will visibly extend outwardly therefrom and thus upwardly when the surface is generally horizontal, e.g., see FIG. 4. The second end 34 of each of the markers 30 has a fractional value marking 36 associated with only one of the fractional value lines 20-26, as will be explained. The tool 10 also preferably has a container 38 containing the markers 30 in random positions and orientations so as to require grasping the markers 30 individually between fingers of a person's hand and manually manipulating the grasped marker 30 to read the fractional value marking 36 thereon and insert the marker 30 into the associated receptacle 28. In this latter regard, an objective or intent is to familiarize the student with handling and manipulating small articles like nails and screws, and properly positioning them on or in relation to a surface, such as a piece of lumber or a wall to be fastened, or the like. The tool 10 of the invention is configured for use with just one hand, to mimic working on a ladder and other applications were the other hand is occupied, such as when holding a piece of lumber or the like to be nailed or screwed, and markers 30 are sized and shaped to mimic small nails or screws commonly handled by tradespersons such as carpenters, and so to give the users experience manipulating those objects that will be commonly handled in their trade, and so that they become more deft in doing so.

Tool 10 will include a container 38 for the markers 30 and can comprise a cavity within the surface of the board 12. The board 12 can additionally have a cover 42 slidable over the container to prevent loss of the markers 30, and to allow randomly dispersing the markers 30 within the container after use. The cover 42 and container 38 can optionally be flush with the board 12 to facilitate stacking of multiple boards, such as for ease of classroom storage and/or handling and transportation.

Use

A student or other user will manually pick up the markers 30 individually in the fingers, one by one or several, manipulate the picked up marker 30 to read the marking 36 on the second end 34, and further manipulate each as required to align it with the appropriate receptacle 28, and insert it into the receptacle 28. This can be done in any order, or in a prescribed order. As a non-limiting example in the latter regard, fractional value lines 20-26 can represent imperial fractions of an inch, such as ½; ¼ths; ⅛ths; and ¹⁄₁₆ths of an inch, respectively, and the student may initially be asked to identify and insert only the markers 30 for ¼th fractional increments. That will include the fractions ¼th and ¾ths as identified by the two lines 22. When mastery of that is demonstrated, the student can proceed to ⅛th increments, which would encompass four lines 24 for: ⅛th; ⅜ths; ⅝ths; and ⅞ths. When mastery of the ⅛ths is demonstrated, the student can proceed on to ¹⁄₁₆ths: ³⁄₁₆ths; ⁵⁄₁₆ths; ⁷⁄₁₆ths; ⁹⁄₁₆ths; 1¹⁄₁₆ths; ¹³⁄₁₆ths; and ¹⁵⁄₁₆ths, identified by the eight lines 26. As will become apparent to the student, and thus learned as an objective of the exercise in a hands on manner, when the denominator of the fractional increment is increased, the number of fractional indicator lines for that denomination of fraction will double compared to the previous fraction. Thus, the eight lines 26 represent: ¹⁄₁₆th; ³⁄₁₆ths; ⁵⁄₁₆ths; ⁷⁄₁₆ths; ⁹⁄₁₆ths; 1¹⁄₁₆ths; ¹³⁄₁₆ths; and ¹⁵⁄₁₆ths. Eventually, a goal can be to correctly identify all of the fractional indicia, e.g., ⅛ths, ¹⁄₁₆ths, ¹⁄₃₂nds, ¹⁄₆₄ths, etc. In the above regard, it should be understood that students and some apprentice vocational tradespersons may have little or no formal education, and thus the fractional indicia may be very difficult for them to grasp.

Figure 7:
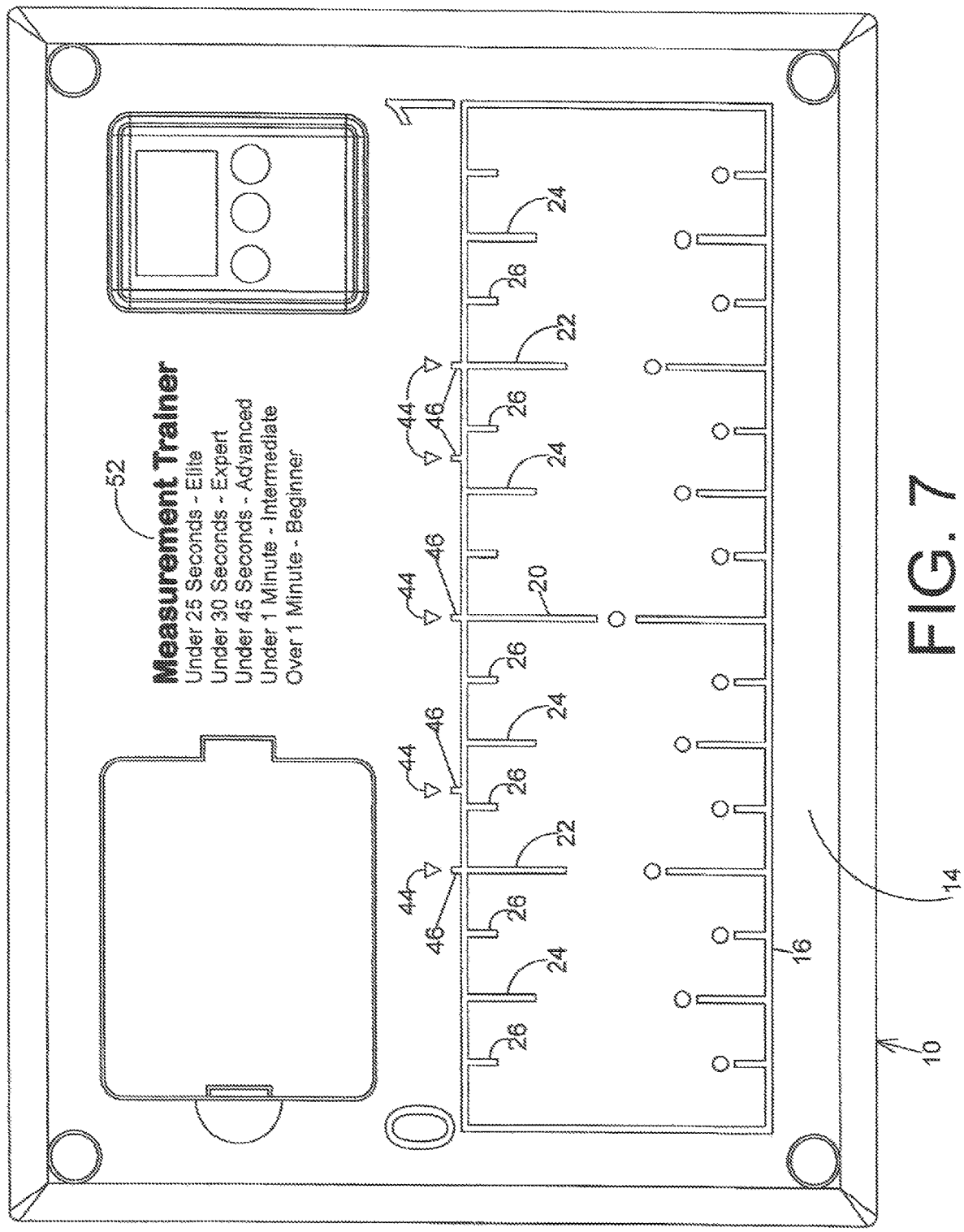
FIG. 7 is another front view of the learning tool of FIG. 4 having additional percentage indicia.

As illustrated in FIG. 7, as an option or variant, the markers can be denoted as percentages. Thus for example, optional markers would include percentage indicia in the form of percentage value lines 46: 50%; 25%; 75%, respectively, so that a user can visually associate 25% to ¼; 50% to the factional indicia 20-26: 50 percent to ½; 75% to ¾, etc. Additional or alternative value lines 46 could be included to denote ⅓ or 33.33%; ⅔ or 66.66%; etc., as shown, so that a user would be able to see the relative values of the respective percentages, and visually associate their location on the board 12 with their relationship to the whole, and the other percentages and/or fractions, with the objective of the user realizing and committing to memory that the value of 33.33 percent and that it has the equivalent fractional value ⅓, and further, is greater than 25% but less than 50%; the fractional value of 66.66% is ⅔ and greater than 50% but less than 75%; and the fractional value of 75% is ¾ and that it is greater than 66.66% or ⅔, and so on. Receptacles 44 can be provided in the board 12 for receiving appropriate markers (not shown) having the respective percentage designations on their ends, in the above described manner with regard to fractional indicia. The receptacles 44 and associated markers can also have a different shape, e.g., triangular as shown, square, rectangular, if desired. The board 12 can likewise be incremented in decimal fractions, e.g., $1/10^{th}$, $1/100^{th}$, $1/1000$th, etc., (not shown) as desired or required for a particular application.

It is contemplated that the numerical values as well as the pattern 16 of fractional incremental indicia can be removable and replaceable in its entirety, or in part, such as by using an overlay 48 magnetically or mechanically fastened; or secured by adhesive or static cling, to board 12 (overlay 48 concealing $1/16$th increments shown in FIG. 6 as a non-limiting example); and multiple overlaying overlays 48 could be utilized in a layered configuration and removed as the lessons progress. For instance, a $1/4$th overlay; a $1/8$th overlay; a $1/16$th overlay, etc. could be employed; or a rolling overlay such as seen on mechanical bus signs), or a flip chart type overlay, as desired or required for a particular application. Of course, the indicia, e.g., fractional value lines 20-26, can also be permanently affixed, e.g., by printing or painting, silk screen, engraving, molding, etc. as illustrated in the other FIGS.

Figure 5:
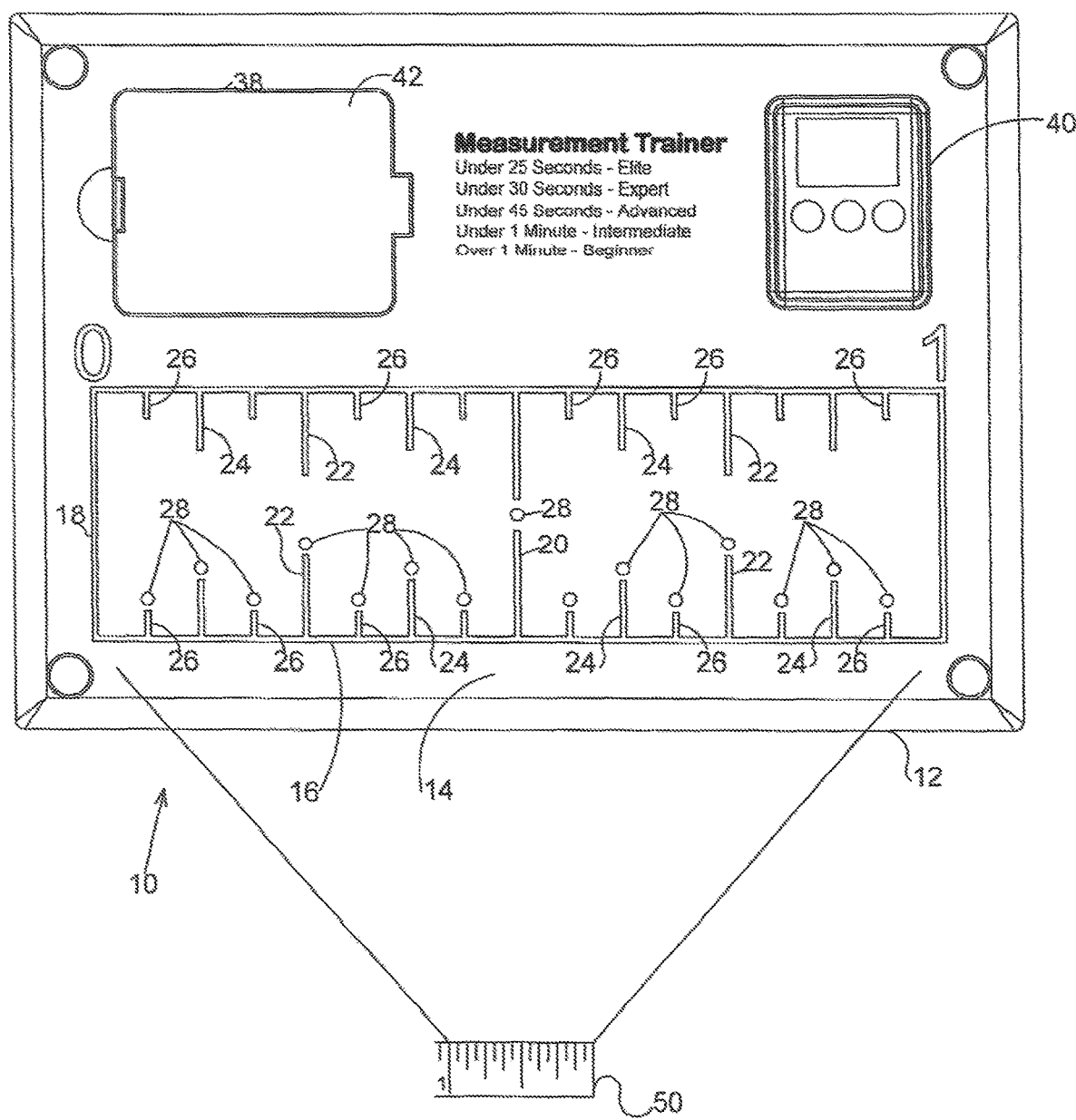
FIG. 5 is a front view of the learning tool of FIG. 4, shown in comparison to a representative measuring device such as a ruler or tape measure.
Figure 6:
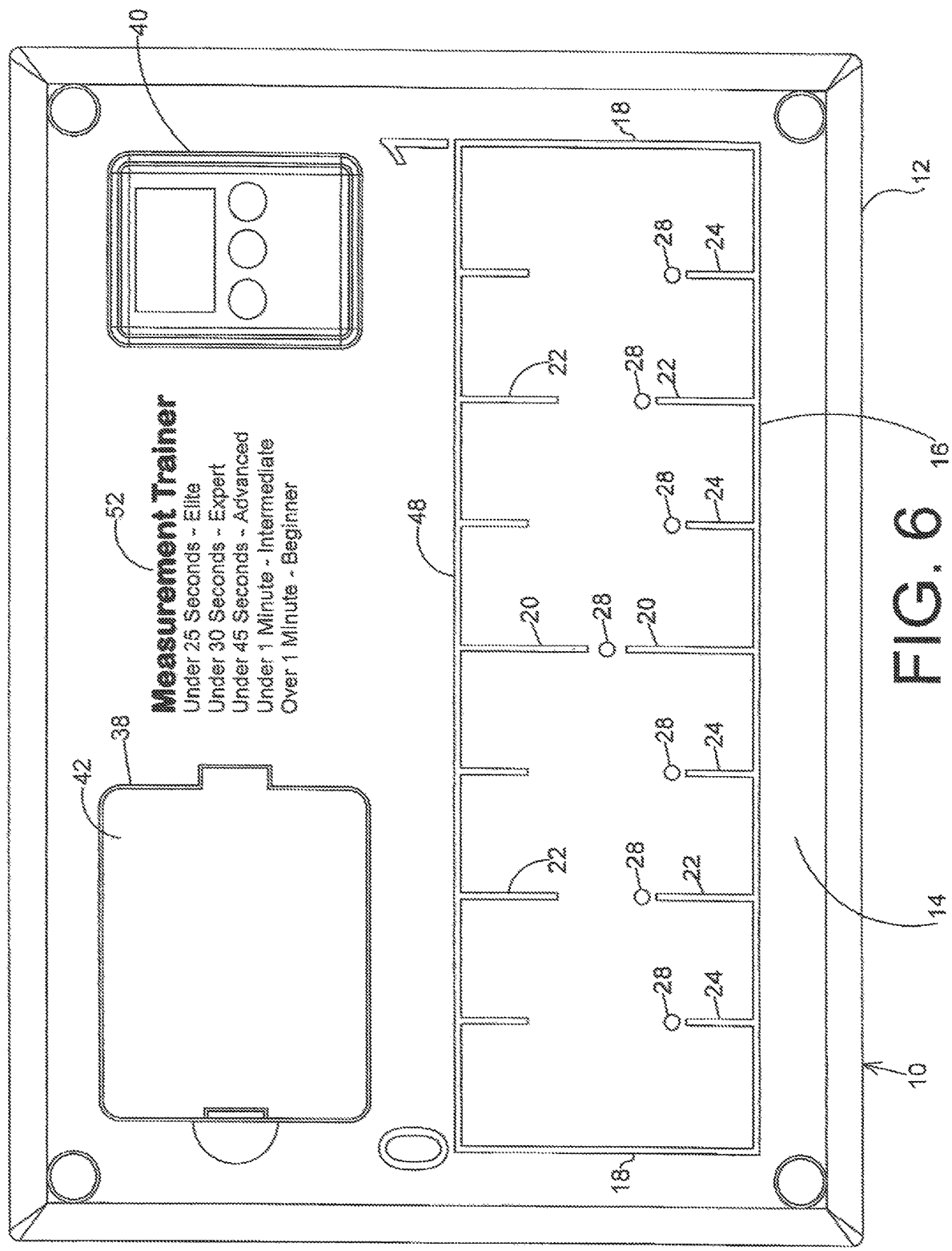
FIG. 6 is another front view of the learning tool of FIG. 4, with an overlay over the pattern of fractional indicia, having a reduced set of fractional indicia.

As further preferred aspects, as depicted in FIG. 5, the fractional value lines 20-26 will have an overall, but substantially enlarged visual appearance of a segment of a ruler 50 between two whole numbers, such as, but not limited to, zero and one inch, the overall size being enlarged, as a non-limiting example, to 6 inches; 10 inches, 24 inches, or any larger desired size, for ease of use. In particular, as a result of this enlargement, the differences between the individual fractional value lines 20-26 are more visible and discernible, so that individuals that have trouble distinguishing the lines can more clearly see their differences and learn to distinguish the different lines.

As a non-limiting example, for a typical measuring device that is a tape measure or ruler having fractional graduations of $1/16$th inch, there will be 16 increments or spaces between whole numbers, and thus a linear pattern of 15 fractional value lines separating the 16 increments. In the typical pattern, the whole number indicator 18 (typically a line) will be longest; the fractional value line 20 for $1/2$ will be the second longest; fractional value lines 22 for $1/4$th and $3/4$ths fractions will be the third longest; and the lines 24 for $1/8$ths and lines 26 for $1/16$ths will be shorter still. So there will be an apparent pattern that can be learned, and it is an object of the invention to instill a positive learning experience having an element of discovery, and an element of success for the learner, so that he or she will be encouraged by the experience using the tool 10 of the invention.

The enlargement of the pattern 16 of indicia has been found to be helpful in the above regard, as the differences in the lengths of the lines 20-26 are more apparent, and the distances between the lines 20; 22; 24; 26 have been found to allow more easily distinguishing them. It also allows a user to easily count both from a whole number, and a recognized fraction such as $1/2$ or $1/4$th. So for example, if it is learned that $1/2$ is equal to two $1/4$ths, that is easily proved to the user student by physically or visually counting lines, and is verified visually, e.g., the student can observe that $1/2$ encompasses two $1/4$ths. Then, it can be explained that $3/4$th is equal to three $1/4$ths and it too is readily verifiable visibly and by counting. From there, it can be discerned that $3/4$th is $1/2$ plus $1/4$th, again verifiable visibly and by counting the fractional value lines. Then it can be further learned that $1/4$th is equal to two $1/8$ths and that $3/8$ths is $3 1/8$ths or $1/4$th plus $1/8$th. It can also be visually memorized that for instance, $1 1/16$ths is one line less than $3/4$ths, and that $3/4$ths is twelve $1/16$ths; and $13/16$ths is one line or one $1/16$th increment greater than $3/4$ths, etc. As another aspect of the learning experience, it can be learned that fractions can be subtracted. So for example, $1/2$ is four $1/8$ths, and that $3/8$ths is $1/2$ minus $1/8$th, which is also easily visually discerned and provable by physical or visual counting. Thusly, $1 1/16$ths is $1/16$th line less than the $3/4$ths line, etc.

To further aid in the learning experience, the enlarged pattern 16 of indicia will preferably mimic or closely resemble a portion between whole numbers of a desired measuring device, such as a tape measure (for example, see measuring device 50 in FIG. 5), so that once the system and pattern of fractional indicia are learned using the tool 10 of the invention, transition to an actual measuring device, although much smaller, will be easier. In this regard, if overlays including the indicia are employed, they can mimic the appearance of common measuring devices, such as a well known yellow tape measure, a folding ruler, etc.

Tool 10 here comprises a timer 40 for determining a time to pick up all or a selected portion of the markers 30; manually manipulate the markers 30 to read the fractional value markings 36 thereof, and insert the markers 30 into the associated receptacles 28, respectively. So for example, for a tool having indicia including 15 total fractional value lines 20-26, an allotted time can be determined for correctly inserting all 15 markers, or some portion of them. The time values can then be used as a metric or measure of success, and for identifying aspects of measurement requiring further practice or explanation. For instance, a student may be timed for inserting the $1/4$th inch family markers and perform well both time wise and accuracy wise, but may have poorer metrics for another fraction family, for instance, $1/16$th values. Or a student may have difficulty with fractions over $1/2$ or below $1/2$, or has success correctly identifying and inserting the markers, but has difficulty doing so in a timely manner. Thus it is evident that the present invention has utility for measuring a variety of aspects of performance and for identifying problem areas.

As illustrated in FIGS. 4-7, learning tool 10 is configured as or incorporated into a game utilizing a game board 12 including a generally flat surface 14 including the linear pattern 16 of graduated indicia (value lines 18-26) representative of fractions of a whole number. The game board 12 has, or has a large section, having an overall appearance of a portion of a hand held tape measure or other measuring device, such as a ruler, yardstick, etc., between two whole number indicators 18 thereof (here "0" and "1") enlarged at least several times relative to the actual measuring device, including a predetermined number of the transverse fractional value lines 20-26 at predetermined spaced intervals representative of fractions of a whole number. Thus, it can be envisioned that the game board 12 will be relatively large, as a non-limiting example, such as about the size of a text book, with easily visually distinguishable fractional indicator lines, but will represent a 1 inch segment of a tape measure for simplicity, so as to accentuate and make much more perceptible the differences between the different fractional value lines 20-26. As a non-limiting example, the spacing between immediately adjacent fractional value lines will be relatively large, on the order of $1/4$ to $1/2$ inch or so, or greater, to facilitate manual counting and visual discernment. As a result for a linear pattern 16 representing $1/16$th inch increments actually $1/4$th inch apart, the overall length of the pattern 16 would be 4 inches. For one having $1/2$ inch spacing, the overall length of the pattern 16 would be 8 inches. The pattern 16 can have any desired width, as a non-limiting example, one fourth its length, or a 1 inch width for a 4 inch length pattern, and a 2 inch length for an 8 inch pattern. Again, the game board 12 will include small receptacles 28 in the surface associated respectively with the value lines 20-26, e.g., at the ends thereof, so as to be visually associated therewith, respectively. The game board 12 includes an integral container 38 holding a quantity of game piece markers 30 in random positions and orientations, each of the markers 30 including a first end 32 having a size so as to be cooperatively insertable in any one of the receptacles 30 such that a second end 34 of the marker 30 will visibly extend outwardly therefrom (as shown in FIG. 4), each of the second ends 34 of the markers 30 having a fractional value marking 36 associated with only one of the fractional value lines 20-26, and wherein the markers 30 are to be inserted into the associated receptacles 28 to play the game. As a non-limiting example, the second ends of the markers can have a sectional extent or width of ¼ inch or so, so as to mimic the head of a screw or nail and to make the marking 36 easily readable, although other sizes can be used as desired for a particular application.

To play, a player will grasp and pick up a marker 30 from the container 38;

manipulate the picked up marker 30 to read the fractional value marking 36 thereof; and insert the marker 30 into the associated receptacle 28, until a predetermined number of the receptacles 28 have been filled or a predetermined number of the markers 30 have been inserted. The game can be played untimed, or on a timed basis, it being desired that players graduate to timed play as it has been found to reinforce memorization and speed of recognition of the fractional value lines, which, in turn, has been found to improve accuracy of use of actual measuring devices and productivity, including by improving dexterity and handling of small fasteners such as screws, nails, and the like. Timing the game allows for determining metrics of proficiency, both in terms of recognition and memorization of fractional indicia, and manual dexterity. Completing the game can be a significant challenge for some students. For a beginning student or for basic learning, only certain fractions may be timed, for instance, ¼ths. If required or desired, an overlay such as overlay 48 can optionally be utilized to reduce confusion. Then, when the larger fractions are mastered, the player can progress to smaller fractions, e.g., ¹⁄₁₆ths as explained above. The game board 12 here includes a legend 52 including times that represent levels of proficiency of playing the game, and which will translate to efficiency and mastery of measuring device use. This will be apparent to the students and they practice with both the game and actual measuring devices, and will provide motivation for achieving mastery. As a non-limiting example a time of over 1 minute for accurately inserting each of the markers would represent a beginner level of proficiency. Under 45 seconds would represent intermediate proficiency. Under 30 seconds, which would represent about 2 seconds per pick up, recognition and insertion per marker, would reflect expert proficiency, and under 25 seconds would indicate mastery. In this latter regard, it has been experimentally determined that reducing just 5 seconds off of a total time of 30 seconds presents a substantial challenge and will be attractive to more competitive players. As another application, the timed game can be utilized by potential employers to provide metrics of measuring proficiency and for manual dexterity; is easily graded; and provides instant feedback as to areas that need improvement.

Thus, there has been shown and described a novel learning tool for fractional indicia of a measuring device and improving manual dexterity, configurable in a preferred embodiment as a game, which overcomes many of the problems set forth above. It will be apparent, however, to those familiar in the art, that many changes, variations, modifications, and other uses and applications for the subject device are possible. All such changes, variations, modifications, and other uses and applications that do not depart from the spirit and scope of the invention are deemed to be covered by the invention which is limited only by the claims which follow.

What is claimed is:

1. A learning tool for learning fractional indicia of a measuring device and improving manual dexterity, the fractional indicia of the measuring device having a first overall size, the learning tool comprising:
   a board having a surface including a linear pattern of graduated indicia representative of fractions of a whole number present on the measuring device, the pattern of graduated indicia having an overall size several times greater than the first overall size, the pattern of graduated indicia comprising at least one transverse whole number indicator and a predetermined plurality of transverse fractional value lines of different lengths at predetermined spaced intervals from the whole number indicator;
   a plurality of receptacles in or on the surface of the board in predetermined relation to the fractional value lines, respectively, such that each of the receptacles is visually associated with only one of the fractional value lines, respectively, each of the receptacles having a predetermined size and shape opening;
   a quantity of markers, each of the markers including a first end having a size so as to be cooperatively insertable in any one of the receptacles such that a second end of the marker will visibly extend outwardly therefrom, each of the second ends of the markers having a fractional value marking associated with only one of the fractional value lines; and
   a container containing the markers in random positions and orientations so as to require grasping the markers individually between fingers of a person's hand and manually manipulating the grasped marker to read the fractional value marking thereof and insert the marker into the associated receptacle.

2. The learning tool of claim 1, wherein the container comprises a cavity within the surface of the board.

3. The learning tool of claim 1, wherein each of the markers comprises a peg having a size of a small nail or screw.

4. The learning tool of claim 1, further comprising a timer for determining a time to grasp all of the markers, manually manipulate the grasped markers to read the fractional value markings thereof, and insert the markers into the associated receptacles, respectively.

5. The learning tool of claim 1, wherein the linear pattern of graduated indicia representative of fractions of a whole number have an overall appearance of a segment of a tape measure.

6. The learning tool of claim 1, wherein the container is incorporated into the board.

7. The learning tool of claim 6, wherein the board comprises a cover slidable over the container to prevent loss of the markers.

8. The learning tool of claim 1 wherein the board has an overall shape and appearance of a portion of a tape measure between two whole number markings thereof.

9. The learning tool of claim 1, wherein the transverse fractional value lines represent fractions of an inch and are spaced apart by distances several times greater than the represented fractions of an inch.

10. The learning tool of claim 9, wherein the transverse fractional value lines include ⅛th inch fraction lines having a first length, ¼th inch fraction lines having a second length greater than the first length, and a ½ inch fraction line having a third length greater than the first and the second lengths, and wherein adjacent ones of the fraction lines are at least about ¼ inch apart.

11. The learning tool of claim 9, wherein the transverse fractional value lines represent ¹⁄₁₆th inch fractions having a fourth length less than the first length.

12. A game for learning and memorizing fractional indicia on measuring devices and improving manual dexterity, comprising:
 a game board including a generally flat surface including a linear pattern of graduated indicia representative of fractions of a whole number, having an overall appearance of a portion of a hand held tape measure between two whole number indicators thereof enlarged at least several times, including a predetermined number of transverse fractional value lines at predetermined spaced intervals of at least ¼ inch representative of fractions of a whole number;
 small receptacles in the surface of the game board at ends of the fractional value lines, respectively;
 a quantity of markers contained in random positions and orientations, each of the markers including a first end having a size so as to be cooperatively insertable in any one of the receptacles such that a second end of the marker will visibly extend upwardly therefrom, each of the second ends of the markers having a fractional value marking associated with only one of the fractional value lines, and wherein the markers are to be inserted into the associated receptacles to play the game.

13. The game for learning and memorizing fractional indicia of claim 12, comprising a timer on the game board configured and operable for timing of the insertion of the markers into the associated receptacles.

14. The game for learning and memorizing fractional indicia of claim 12, wherein the markers are held in a container incorporated into the game board beside the linear pattern of graduated indicia.

15. The game for learning and memorizing fractional indicia of claim 12, wherein the container is recessed into the game board.

16. The game for learning and memorizing fractional indicia of claim 12, further comprising a timer for determining a time to grasp all of the markers, manually manipulate the grasped markers to read the fractional value markings thereof, and insert the markers into the associated receptacles, respectively.

17. The game for learning and memorizing fractional indicia of claim 12, wherein each of the markers comprises a peg having a size of a small nail or screw.

18. The game for learning and memorizing fractional indicia of claim 12, wherein the linear pattern of graduated indicia has an overall appearance of a portion of a tape measure.

19. The game for learning and memorizing fractional indicia of claim 12, wherein the transverse fractional value lines represent fractions of an inch and are spaced apart by distances substantially greater than the represented fractions of an inch.

20. The game for learning and memorizing fractional indicia of claim 12, wherein the transverse fractional value lines represent ⅛th inch fractions.

21. The game for learning and memorizing fractional indicia of claim 12, wherein the transverse fractional value lines represent ¹⁄₁₆th inch fractions.

22. A method for learning fractional indicia of a measuring device and improving manual dexterity, comprising steps of:
 providing a board having a surface including an enlarged linear pattern of graduated indicia representative of fractions of a whole number of a measuring device, comprising at least one transverse whole number line of a first length and a predetermined plurality of transverse fractional value lines of shorter lengths at predetermined intervals from the whole number line, and a plurality of receptacles in or on the surface of the board in predetermined relation to the fractional value lines, respectively, such that each of the receptacles is visually associated with only one of the fractional value lines, respectively, each of the receptacles having a predetermined size and shape opening;
 providing a quantity of markers in random positions and orientations in a container, each of the markers including a first end having a size so as to be cooperatively insertable into any of the receptacles, and a second end having a fractional value marking associated with only one of the receptacles; and
 a person individually manually:
 i. grasping and picking up a marker from the container;
 ii. manipulating the picked up marker to read the fractional value marking thereof; and
 iii. inserting the marker into the associated receptacle,
until a predetermined number of the receptacles have been filled or a predetermined number of the markers have been inserted.

23. The method for learning fractional indicia of claim 22, comprising additional steps of:
 providing a timer; and
 timing the steps of individually manually grasping, manipulating, and inserting at least a substantial number of the markers.

24. The method of claim 22, comprising a further step of determining a score for correctly inserted markers by the person.

25. The method of claim 24, comprising a further step of evaluating the score to determine the person's knowledge and recollection of the fractions.

26. The method of claim 23, comprising a further step of determining a score for time to insert the markers.

27. The method of claim 26, comprising a further step of evaluating the score to determine a value for the person's manual dexterity.

* * * * *

UNITED STATES PATENT AND TRADEMARK OFFICE
CERTIFICATE OF CORRECTION

PATENT NO. : 10,529,251 B2
APPLICATION NO. : 15/800862
DATED : January 7, 2020
INVENTOR(S) : John L. Gaddis Page 1 of 1

It is certified that error appears in the above-identified patent and that said Letters Patent is hereby corrected as shown below:

In the Specification

Column 8, Line 29, "1 1/16ths" should be --11/16ths--.

Column 8, Line 36, "1 1/16ths" should be --11/16ths--.

Column 9, Line 62, "1 1/16ths" should be --11/16ths--.

Column 10, Line 2, "1 1/16ths" should be --11/16ths--.

Signed and Sealed this
Twenty-fifth Day of February, 2020

Andrei Iancu
*Director of the United States Patent and Trademark Office*